INVENTOR.
John Z. DeLorean
BY
David A. Greenlee
ATTORNEY

United States Patent Office 3,451,719
Patented June 24, 1969

3,451,719
SEAT ANCHORAGE
John Z. de Lorean, Birmingham, Mich., assignor to General Motors Corporation, Detroit, Mich., a corporation of Delaware
Filed Nov. 24, 1967, Ser. No. 685,527
Int. Cl. B60r 21/10; A47c 31/00
U.S. Cl. 297—385                                                3 Claims

ABSTRACT OF THE DISCLOSURE

A vehicle seat cushion is provided with a rear-mounted transverse bar about which are looped seat belt straps. Upon interengagement of the strap buckles to form a seat belt, the tensioning of the straps about the bar creates a frictional force resisting forward movement of the seat.

---

This invention relates generally to vehicle seats and more particularly to an anchorage for a seat.

A conventional vehicle front seat is mounted on the body through a seat adjuster which permits forward and rearward movement of the seat. In order to preclude movement of the seat upon sudden vehicle deceleration, the components of the adjuster must be made exceedingly strong and are, therefore, costly. This invention provides an anchorage for the seat separate from the seat adjuster so that the adjuster may be made of lighter weight materials to reduce the cost.

It is an object of this invention to provide a seat anchorage that normally permits forward and rearward adjustment of the seat but is operable to restrain sudden forward movement. Another object is to utilize the vehicle seat belt straps in the anchorage.

In carrying out the objects of this invention, the seat belt straps are looped about a seat-mounted bar so that, upon tensioning of the straps by formation of the seat belts about an occupant, the straps grip the bar to provide a restraint against forward seat movement.

These and further objects and features of this invention will become readily apparent upon reference to the following detailed description of the annexed drawings in which.

Figure 1:
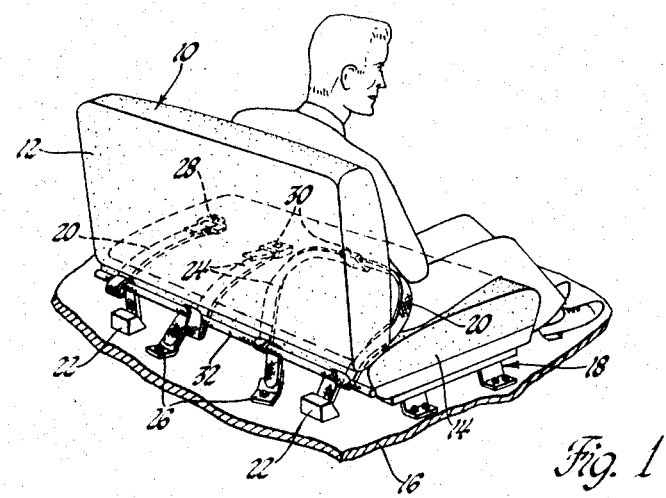
FIGURE 1 is a perspective view of a vehicle seat having a seat anchorage according to this invention.

Referring now to FIGURE 1 of the drawings, a vehicle seat 10 comprises a seat back 12 and a seat cushion 14 which is mounted to the floor 16 of the body by a seat adjuster 18, such as that shown in 3,310,274—Tanaka. This adjuster permits selective forward and rearward movement of the seat. The seat is provided with a seat belt arrangement comprising a pair of outboard straps 20, which are connected to floor-mounted retractors 22, and a pair of inboard straps 24 which are anchored to the floor at 26.

Each strap 20 mounts a buckle or D-ring 28 which is engageable with a conventional push button buckle 30 mounted on the free end of the associated strap 24 to form a seat belt about a seat occupant, as shown in FIGURE 1. The straps 20, 24 are made of nylon or any other strong, durable webbing material.

Figure 2:
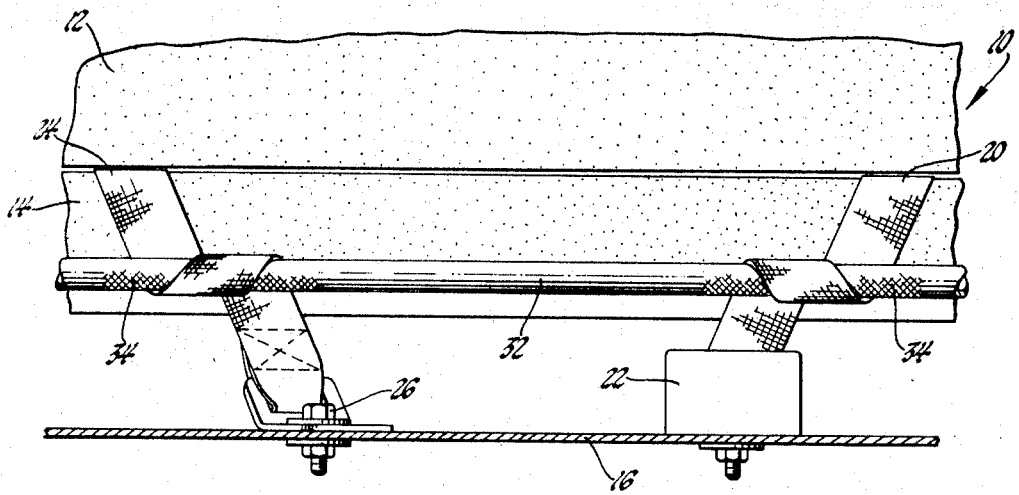
FIGURE 2 is an enlarged detailed view of a portion of FIGURE 1.
Figure 3:
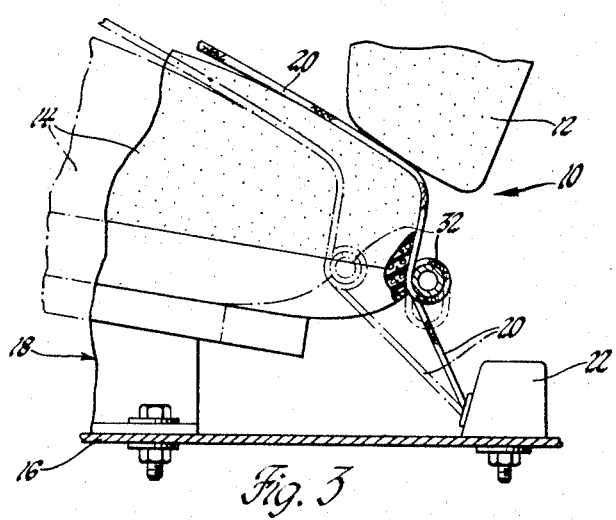
FIGURE 3 is a partially broken away end elevational view of a portion of FIGURE 1.

Referring now to FIGURES 2 and 3, a transverse bar 32 extends across the rear of seat cushion 14 and has its ends secured in a suitable manner to the frame of the cushion. Each strap 20 and 24 is looped about the bar and extends between the seat back 12 and cushion 14 onto the seat cushion. When the buckles are disengaged and seat 10 is adjustable forwardly and rearwardly, bar 32 slides freely along the straps which remain continuously looped about the bar.

However, when buckles 28 and 30 are engaged to form a seat belt about a seat occupant, the tensioning of the straps about the occupant's pelvis will cause the straps to grip bar 32 tightly, creating a frictional force resisting movement of the bar through the loops.

The bar 32 is preferably provided with roughed friction surfaces 34, such as formed by knurling, in the areas of strap contact, to increase the friction between the belt loops and the bar. The loops preferably extend at least 360° about the bar to increase the area of frictional contact when the straps are tightened.

Thus, in the event of sudden deceleration or acceleration, forward movement of seat 10 will be resisted by adjustment mechanism 18 and additionally by the frictional engagement of the straps about the bar.

While only one embodiment of this invention has been shown and described, modifications are contemplated within the scope of this invention.

I claim:
1. In a vehicle body having a seat mounted thereon for forward and rearward movement, a seat anchorage comprising a bar mounted on the seat at the rear thereof, a flexible strip anchored to the body rearwardly of the seat and freely looped about the bar, to normally permit forward movement of the seat, and means operable to tighten the strap loop about the bar and restrain sudden forward movement of the seat.

2. In a vehicle body having a seat mounted thereon for movement forwardly and rearwardly of the vehicle, a seat anchorage comprising a bar mounted on the seat at the rear thereof, and extending transversely of the seat, and a seat belt assembly including a pair of straps anchored to the body rearwardly of the seat, the straps being continuously looped about the bar and normally permitting forward movement of the seat by sliding the bar along the straps, and means for tensioning the straps about a seat occupant to form a seat belt, the tensioned straps gripping the bar to resist sliding of the bar along the strap and provide a restraint against sudden forward movement of the seat.

3. The seat anchorage of claim 2 wherein the seat includes a back and a cushion mounted on a frame, the bar is mounted on the frame and has a roughened friction surface, the straps are looped at least 360° about the roughened friction surfaces of the bar and extend between the back and cushion onto the seat cushion, and the tensioning means comprise a pair of buckles mounted on the free ends of the straps and interengageable to form a seat belt about the occupant to tension the straps and tighten the strap loop about the bar.

References Cited

UNITED STATES PATENTS

| 2,700,412 | 1/1955 | Evans et al. | 297—385 |
| 2,823,046 | 2/1958 | Banta | 297—385 |
| 2,990,009 | 6/1961 | Moeller | 297—385 |
| 3,131,450 | 5/1964 | Zinkel | 29—197 |
| 3,328,080 | 6/1967 | Dall | 297—385 |

FOREIGN PATENTS

| 1,256,799 | 2/1961 | France. |

JAMES T. McCALL, Primary Examiner.

U.S. Cl. X.R.
297—216